A. JUTILA.
RESILIENT WHEEL.
APPLICATION FILED APR. 3, 1914.
1,217,190.
Patented Feb. 27, 1917.
2 SHEETS—SHEET 1.
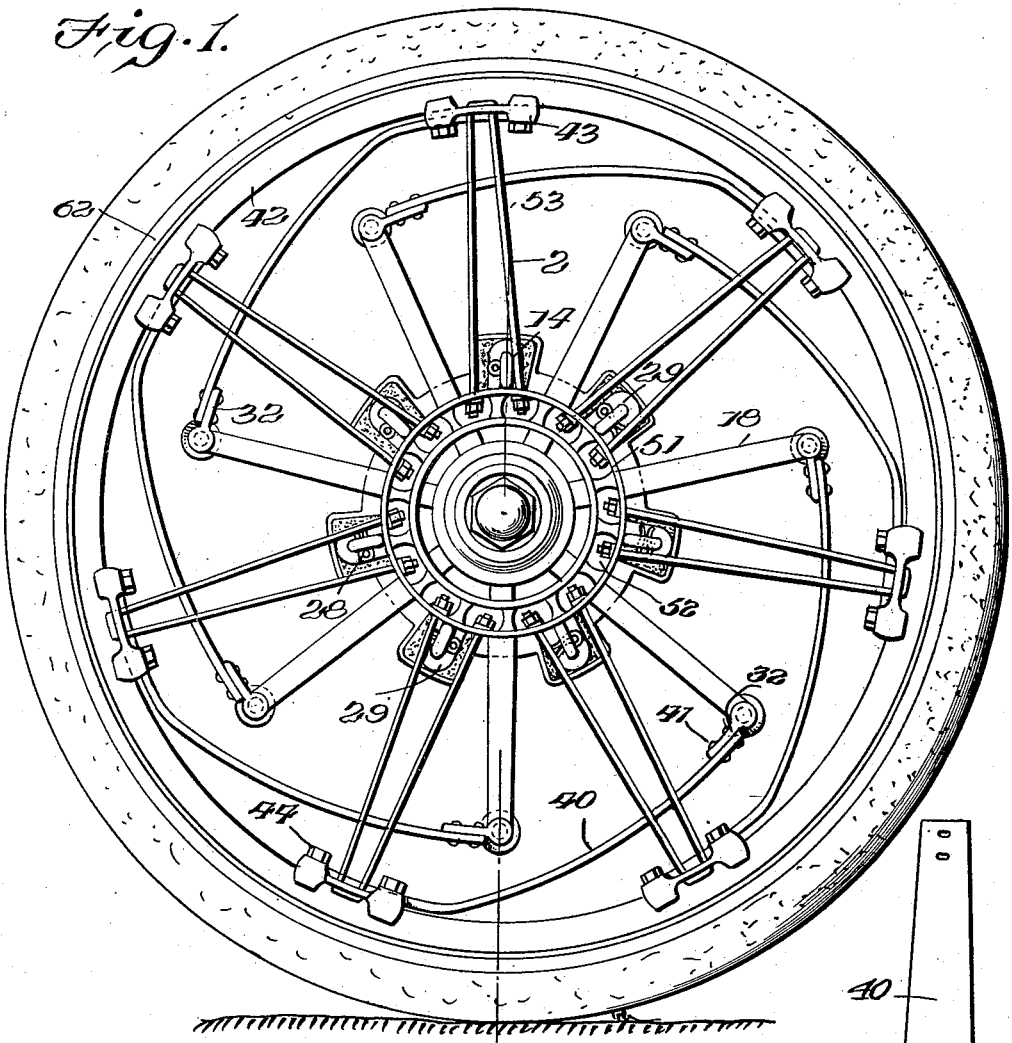
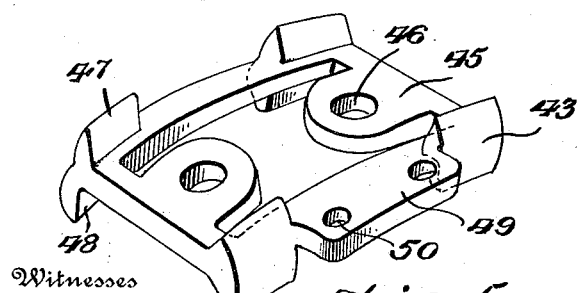
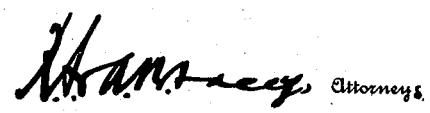

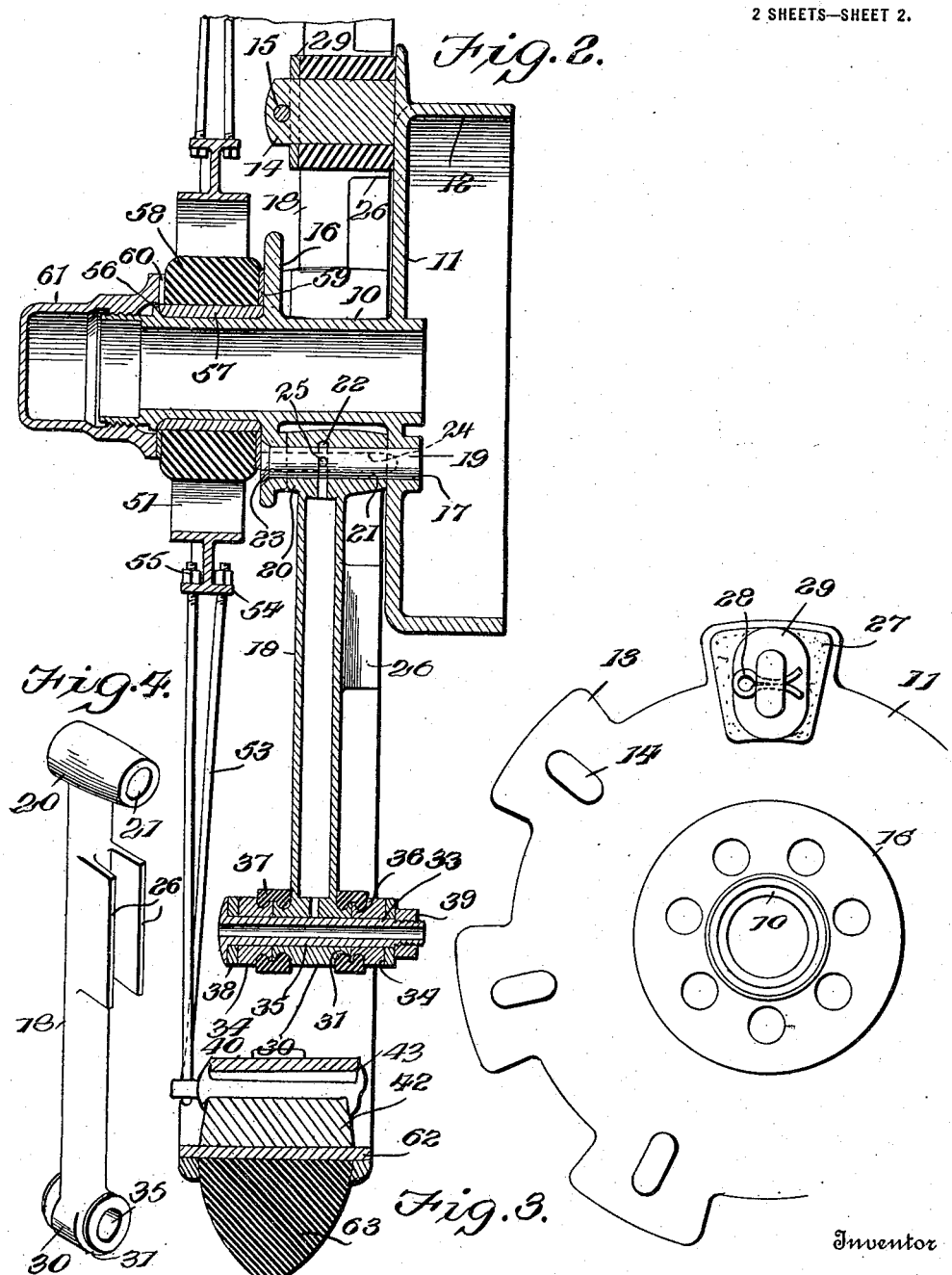

UNITED STATES PATENT OFFICE.

ARTTURI JUTILA, OF DULUTH, MINNESOTA.

RESILIENT WHEEL.

1,217,190.

Specification of Letters Patent. Patented Feb. 27, 1917.

Application filed April 3, 1914. Serial No. 829,331.

*To all whom it may concern:*

Be it known that I, ARTTURI JUTILA, a citizen of Finland, residing at Duluth, in the county of St. Louis and State of Minnesota, have invented certain new and useful Improvements in Resilient Wheels, of which the following is a specification.

My present invention relates to improvements in vehicle wheels and more particularly to resilient or spring wheels adapted for use upon self-propelled vehicles, the primary object of my invention being the provision of a resilient or spring wheel which may be employed as the drive wheel of a self-propelled vehicle and in which the hub is floatingly supported with respect to the wheel rim by pivoted spokes and springs connecting the spokes and rim.

A further object of my invention is to provide means for limiting the possible displacement of the hub with respect to the rim, thereby preventing breakage of the cushioning springs of the wheel.

A still further object of my invention is to provide means for limiting the amount of turning movement which the hub may have with respect to and independent of the rim.

And a still further object of my invention is the provision of a spring wheel of the above described character which shall be light and economical in construction and at the same time strong, durable and efficient in service.

With these and other objects in view, my invention will be more fully described, illustrated in the accompanying drawings, and then specifically pointed out in the claims which are attached to and form a part of this application.

In the drawings:—

Figure 1 is a side elevation of an improved wheel constructed in accordance with my invention;

Fig. 2 is a fragmentary sectional view taken on the line 2—2 of Fig. 1;

Fig. 3 is a fragmentary side elevation of the wheel hub proper;

Fig. 4 is a detail perspective view of one of the spokes removed from the wheel;

Fig. 5 is a detail perspective view of one of the plates or brackets by means of which the springs connecting the spokes with the rim are secured to the rim and which also serve as securing means for brace members supporting a cushioning member arranged to limit eccentric displacement of the hub.

Fig. 6 is a detail view of one of the springs employed in connecting the spokes to the felly of the wheel.

Corresponding and like parts are referred to in the following description and indicated in all the views of the drawings by the same reference characters.

The preferred embodiment of my invention includes a hub 10 provided adjacent one end with an annular flange 11, the marginal edge portion of which is laterally directed as at 12 to provide a brake drum. This flange is provided upon its edge at intervals, with radial extensions or ears 13 and stops or studs 14, preferably formed integrally with the flange and extensions thereof, project at right angles from the flange 11, these studs being preferably elliptical in cross section and provided adjacent their free ends with transverse perforations 15. The purpose of these studs will be hereinafter fully explained. The hub 10 is also provided with a second flange 16 spaced from the first and both the flanges 11 and 16 are provided with a plurality of alined bores 17. A plurality of spokes, each indicated as a whole by the numeral 18, are pivotally mounted by their inner ends between the flanges 11 and 16 upon pivot pins 19 passed through said ends and through the alined bores 17.

These spokes, as best shown in Figs. 2 and 4 of the drawings, are preferably circular in cross section and may be tubular or solid as preferred. Each spoke terminates at its inner end in a cylindrical head 20 formed at right angles to the body of the spoke and provided with a bore 21 through which the pivot pin 19 passes, this bore being provided intermediate of its length with an annular groove 22. The pivot pins 19 are provided with heads 23 seated in countersunk sockets formed in the outer face of the flange 16 and each of said pins is provided throughout practically its entire length with a lubricant receiving socket 24. A perforation 25 establishes communication between this socket and the groove 22 of the spoke head. Upon assembling the wheel, these pivot pins are filled with any suitable hard lubricant which gradually feeds through the perforations and keeps the pivotal connections of the spokes well oiled.

As shown in Fig. 1, each spoke extends radially between adjacent studs 14 of the flange 11 and each spoke is provided intermediate of its length with a pair of spaced inwardly directed wings 26 projecting in the path of the studs. Cushions 27 of rubber or other suitable material are mounted upon the studs 14 and held in place by cotter pins 28 which are passed through the perforations 15 of the studs, the cotter pins engaging against washers 29 positioned against the outer faces of the cushions. As shown, the side edges of these cushions converge inwardly toward each other to extend radially with respect to the wheel in order to afford a uniform surface of contact for any spoke which may be swung against either face. These cushions serve as an absolute stop to check any undue swinging of the spokes with respect to the hub.

The outer ends of the spokes 18 terminate in cylindrical heads 30 each provided adjacent each end with an angular groove 31. A bracket, indicated as a whole by the numeral 32, is pivotally mounted upon each of the heads 31 by tubular pivot pins 33 passed through spaced perforated ears 34 formed upon one end of the bracket and through the bore 35 of the spoke head 30. These ears are thickened to provide inwardly directed cylindrical portions having annular grooves 36 corresponding to the grooves 31 of the spoke heads and dust rings 37 of rubber or other suitable material engage about the joints thus formed, seating in the grooves as clearly shown in Fig. 2 of the drawings. Washers 38 are positioned against the outer faces of the ears 34 and the pin 33 is secured against displacement by a nut 39.

A leaf spring 40 is riveted or otherwise secured as shown at 41 to each of the spoke carried brackets 32 and the opposite ends of these leaf springs are secured in proper spaced relation to the inner face of the wheel felly 42 by securing plates 43 and bolts 44. The wheel felly may be of any desired character, although for the sake of lightness it is preferably constructed of wood. The leaf springs 40 taper somewhat from their outer to their inner ends, the outer edges of the springs being tapered more than the inner edges in order to position the felly slightly outside of the plane of the spokes, as shown in Fig. 2.

The attaching plates 43 each include a body portion 45 which is preferably skeletonized for the sake of lightness and is provided adjacent each end with bolt receiving bores 46. The plate is provided at its ends and upon each side with outwardly directed flanges 47 which engage the sides of the felly and is further provided with inwardly directed flanges 48 between which the outer ends of the leaf springs seat. The outer edge of the plate is provided intermediate of its length with a laterally directed flange 49 having spaced perforations 50. The same bolts which serve to secure the springs 40 to the plates 43 serve to secure the plates to the felly.

As best shown in Fig. 1 of the drawings, the leaf springs are substantially straight at their inner ends, being bowed inwardly at their outer ends. The outer end portions of the springs immediately adjacent the attaching plates 43 are bent just to clear the inner face of the felly in order that when under undue strain, caused by excessive loading of the vehicle, the outer end portions of the leaf springs may engage directly against the wheel felly and be supported thereby. It will be clear that the spokes proper 18, together with the springs 40, form in effect what may be termed resilient spokes and that portions of these spokes are movable circumferentially with respect to the hub and that it is such movable portions which engage the stops.

The wheel above described is extremely resilient and at the same time strong and durable. The extent to which the hub of the wheel may turn independent of the felly is limited by the cushioned studs 14 which extend in the path of the spokes and all lateral movement of the hub, with respect to the felly of the wheel, is prevented by the manner in which the spoke ends are pivoted between the flanges 11 and 16 and between the ears of the spring holding brackets 32. Furthermore, the attaching plates 43 prevent any possibility of swinging movement of the outer ends of the springs.

In order however, to prevent undue movement of the wheel hub toward the felly when subjected to heavy loads, I provide a stop ring, indicated as a whole by the numeral 51. This ring, as best shown in Fig. 2 of the drawings, is substantially I-shaped in cross section with the intermediate web skeletonized or cut-away at spaced intervals as shown at 52. This ring is spaced about the outer end portion of the hub 10 and is held in position by U-shaped braces 53 preferably, of resilient metal, the ends of which are passed inwardly through the perforations 50 of the attaching plates 43 and through bores formed in the outer flange 54 of the stop ring 51. These ends of the braces are threaded to receive nuts 55 by which the braces may be tightened and adjusted to properly support the stop ring 51 in concentric position with respect to the rim. These braces are interposed one between each pair of adjacent spokes and their inner ends are preferably staggered as shown in Fig. 2 to prevent lateral movement of the stop ring. The openings formed in the web of the stop ring are formed adjacent the terminals of the braces and therefore facilitate the application of the nuts 55 by which the braces are secured in place.

The body portion of the hub 10 is provided adjacent its outer end with a third annular flange 56 which merely serves as a retaining flange for a ring 57 of leather or other suitable material. An annular cushioning member 58 of rubber or other material surrounds this ring, a washer 59 being interposed between it and the flange 16, while a second washer 60 is interposed between it and a dust cap 61 which is threaded upon the outer end of the hub. This cushioning ring 58 lies in the plane of the stop ring 51 and upon undue movement of the hub toward the felly of the wheel engages the stop ring to check such movement.

The felly may be provided with any suitable sort of rim 62 adapted to receive a tire 63 of any desired type. Usually the tire 63 will be formed of solid rubber or other material of like nature as the resiliency of the wheel itself does away with any necessity for pneumatic tires.

From the foregoing description it will be seen that I have provided a spring wheel construction in which the sole connection between the hub and rim is through interposed leaf springs. At the same time, the construction is such that any undue movement of any sort of the hub with respect to the rim of the wheel is limited and ultimately checked.

Although I have illustrated and described my spring wheel in all its details of construction, it will of course be understood that I do not wish in any way to limit myself to the specific details set forth, as various minor changes, within the scope of the appended claims, may be made at any time, without in the slightest degree departing from the spirit of my invention.

Having thus described the invention, what is claimed as new is:

1. A resilient wheel including a hub, a felly, resilient means suspending the hub within the felly and including leaf springs, plates bearing against the felly and formed with flanges engaging the sides of the felly and with flanges between which the leaf springs seat, fastening means passed through the springs and plates and into the felly whereby the springs are secured to the felly and held against twisting movement, a stop ring operatively disposed with respect to the hub, flanges projecting laterally from the plates, and stop ring supporting members secured to the lateral flanges and the stop ring.

2. A resilient wheel including a hub, a felly, resilient spokes, portions of which are circumferentially movable with respect to the hub, connecting the hub and felly, a brake drum supporting flange carried by the hub and formed with radial ears projecting beyond the drum, and stops projecting laterally from the ears between the spokes to be engaged by the circumferentially movable portions of the spokes whereby turning of the hub with respect to the felly will be limited.

3. A resilient wheel including a hub, a felly, resilient spokes, portions of which are circumferentially movable with respect to the hub, connecting the hub and felly, a brake drum supporting flange carried by the hub and formed with radial ears projecting beyond the drum, stops projecting laterally from the ears between the spokes to be engaged by the circumferentially movable portions of the spokes to limit independent turning movement of the hub with respect to the felly, and laterally directed reinforcing wings formed upon the spokes in position to provide in connection with the spokes enlarged bearing surfaces for engagement with the stops.

In testimony whereof I affix my signature in presence of two witnesses.

ARTTURI JUTILA. [L. S.]

Witnesses:
HELMER JOHNSON,
J. M. THOMPSON.